US012420248B2

(12) United States Patent
Herd

(10) Patent No.: US 12,420,248 B2
(45) Date of Patent: Sep. 23, 2025

(54) TRANSPORTABLE BLENDING SYSTEM

(71) Applicant: PfP Industries, LLC, Houston, TX (US)

(72) Inventor: Michael David Herd, Fort Worth, TX (US)

(73) Assignee: PfP Industries, LLC, Houston, TX (US)

( * ) Notice: Subject to any disclaimer, the term of this patent is extended or adjusted under 35 U.S.C. 154(b) by 841 days.

(21) Appl. No.: 17/712,954

(22) Filed: Apr. 4, 2022

(65) Prior Publication Data

US 2023/0311081 A1 Oct. 5, 2023

(51) Int. Cl.

| | |
|---|---|
| ***B01F 33/502*** | (2022.01) |
| ***B01F 25/312*** | (2022.01) |
| ***B01F 35/21*** | (2022.01) |
| ***B01F 35/221*** | (2022.01) |
| ***B01F 35/71*** | (2022.01) |
| ***B65D 88/12*** | (2006.01) |
| ***B65D 90/00*** | (2006.01) |
| *B01F 101/49* | (2022.01) |

(52) U.S. Cl.

CPC .... *B01F 33/5023* (2022.01); *B01F 25/31243* (2022.01); *B01F 35/2117* (2022.01); *B01F 35/2211* (2022.01); *B01F 35/71731* (2022.01); *B01F 35/7176* (2022.01); *B01F 35/71805* (2022.01); *B65D 88/121* (2013.01); *B65D 90/008* (2013.01); *B01F 2101/49* (2022.01)

(58) Field of Classification Search

CPC ........................... B01F 33/502; B01F 33/5023

USPC ........................................... 366/163.2, 181.8

See application file for complete search history.

(56) References Cited

U.S. PATENT DOCUMENTS

| | | | | |
|---|---|---|---|---|
| 8,714,809 B2 * | 5/2014 | Brouillette .............. | B28C 9/004 366/136 |
| 2022/0250012 A1 * | 8/2022 | Webb ................ | B01F 35/71731 |

* cited by examiner

*Primary Examiner* — David L Sorkin

(74) *Attorney, Agent, or Firm* — Vorys, Sater, Seymour and Pease LLP

(57) ABSTRACT

A transportable blending system includes a container enclosure including a base, a roof, opposing first and second ends, and opposing first and second sidewalls, a pump fluidly coupled to an inlet manifold penetrating the container enclosure, wherein a base fluid is conveyed to the pump via the inlet manifold, and a mixing unit in fluid communication with the pump to receive the base fluid. A hopper is fluidly coupled to the mixing unit and has an inlet aligned with an opening defined in the roof, wherein an additive is delivered to the hopper via the opening to be conveyed to the mixing unit and blended with the base fluid to generate a working fluid.

21 Claims, 6 Drawing Sheets

TRANSPORTABLE BLENDING SYSTEM

BACKGROUND

In a number of operations related to the oil and gas industry, working fluids are utilized to perform or support a number of functions, including drilling, lubrication, fracturing, mitigating fluid loss, and the like. Working fluids may include a number of rheological modifiers and functional additives that modify various fluid properties such as density, viscosity, solids content, pH, and the like. Working fluid formulation may require specialized equipment to blend and homogenize the constituent additives and phases, which may include industrial scale mixers and blenders that disperse and hydrate rheological modifiers and other additives to avoid problems such as chemical dusting, uneven mixing, lumping, and the formation of “fish eyes.”

Following formulation, working fluids are employed directly or packaged in various storage containers for transport or later use. In cases where an intended work site is remote, working fluids are commonly prepared in a central mixing plant and transported to the work site by suitable transportation methods. Depending on the distance to the work site, chemical formulations may also include stabilizing chemicals to prevent product separation and degradation.

For large operations, transport costs are a significant consideration, particularly for lower density materials such as fluids, which can impact project feasibility. Alternatively, working fluids may be formulated on site, however, site preparation, transport, and installation of the necessary mixing plant equipment remains a substantial hurdle in terms of time and capital expense.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
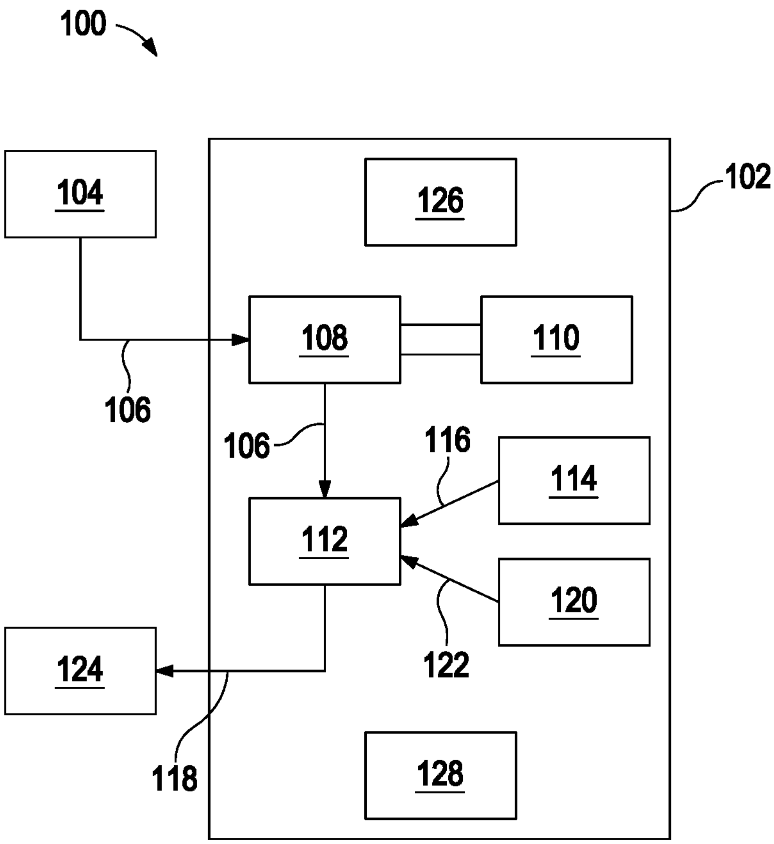
FIG. 1 is a schematic diagram of an example transportable blending system in accordance with one or more aspects of the present disclosure.

The present disclosure is related to transportable blending systems and, more particularly, to transportable or modular systems designed for the formulation of various fluid compositions.

The transportable blending systems disclosed herein are applicable to the formulation and combination of working fluids for various industrial applications. Embodiments described herein can be transported to and installed at a work site for incorporation into various fluid circulating systems and blending processes. Everything a full size, conventional mixing plant might include may be included in the presently described transportable blending systems, but on a smaller scale.

The customizable and modular blending systems are advantageous for several reasons. For example, the transportable blending systems reduce setup time for operation to one or more days, as opposed to several weeks for traditional mixing plant builds. Moreover, the transportable blending systems are constructed using a space efficient container enclosure format, which can reduce the “footprint” of the system at the job site by about 40% when compared to standard arrangements of equivalent equipment. Furthermore, the transportable blending systems facilitate the blending of working fluids on site, which allows additives to be transported as dry solids or concentrates. This can dramatically minimize shipping costs and reduce the need for stabilizing treatments or resuspension of solids. This can also enable real time adjustment of chemical compositions on site in response to changing application demands. Lastly, the systems described herein also provide the removal of transporting finished goods when set up at end user sites, which have proven to periodically cause composition changes in some fluids depending on temperature, length of time in transport, and cleanliness of transports.

The methods disclosed herein are directed to assembling a blending system within a space efficient container enclosure, transporting the blending system to a desired location, and utilizing the blending system to produce a working fluid by blending one or more additives with a base fluid. Example blending methods may include the combination of a base fluid with various additives and rheological modifiers, such as viscosifiers and friction reducers. The transportable blending systems described herein may allow working fluid formulation at the work site and, in some cases, increase the yield and rate of hydration for dried or slurried polymers and clays.

While the embodiments discussed herein are directed primarily to producing working fluids commonly used in the oil and gas industry, those skilled in the art will readily appreciate that the principles disclosed herein are equally applicable to other industries similarly focused on blending base fluids and additives to generate a working fluid. For example, the principles of the present disclosure may alternatively be applied to the production of food, fertilizers, paints, water treatment, and the like.

FIG. 1 is a schematic diagram of an example transportable blending system 100 according to one or more aspects of the present disclosure. As illustrated the transportable blending system 100 (hereafter the “system 100”) may include a container enclosure 102 configured to house the various mechanical and electrical equipment, plumbing, tools, etc. required to operate the system 100. The container enclosure 102 can be a portable container. As discussed in more detail below, in at least one embodiment, the container enclosure 102 may comprise a type of intermodal shipping container, such as a standardized ISO container that is compliant with universal shipping dimensions and configurations dictated by the International Organization for Standardization (ISO).

The components of the system 100 may be fully or partially assembled within the container enclosure 102 at one location, and then transported via any suitable means (e.g., truck, rail, boat, etc.) to a desired location for use. Once properly delivered and situated at the desired location, the system 100 may be fluidly coupled to a base fluid source 104 that contains (stores) a base fluid 106. The system 100 may be operable to combine (e.g., mix, blend, etc.) the base fluid 106 with one or more additives to form a working fluid. As used herein, the term "fluidly coupled" refers to a coupled arrangement where a first component is placed in fluid (e.g., liquid, gas, flowable powder, etc.) communication with a second component, such as through suitable plumbing (e.g., pipes, conduits, valving, couplings, etc.). The base fluid source 104 may comprise any suitable type of container or reservoir capable of storing or housing the base fluid 106. Example base fluid sources 104 include, but are not limited to, a tank or container (e.g., a separate ISO container/tank), a tanker truck, a pipeline, a source of recycled working fluid, a surface reservoir, a subterranean reservoir, or any combination thereof. In at least one embodiment, the base fluid source 104 may comprise a tank or container capable of being hoisted from a horizontal resting position to an upright, vertical position.

The base fluid 106 contained within the base fluid source 104 is not particularly limited, and may vary depending on application. Example base fluids 106 include, but are not limited to, an aqueous fluid (e.g., fresh water, a brine, a salt solution, etc.), a non-aqueous fluid, a base oil, diesel fuel, an emulsion (e.g., direct and invert emulsions), or any combination thereof.

The container enclosure 102 may house several component parts pertaining to the system 100, including various mechanical, electrical, electromechanical, and hydraulic components. The equipment and components housed within the container enclosure 102 may be fully or partially assembled within the container enclosure 102 prior to transporting the system 100 to a desired site or location. In the illustrated embodiments, the system 100 can include at least a pump 108, a motor 110 arranged to drive the pump 108, and a mixing unit 112 in fluid communication with the pump 108. As described in more detail below, the mixing unit 112 may include a type of eductor jet configured to help in the blending process.

The pump 108 may comprise any suitable type of pump capable of delivering (pumping) the base fluid 106 to the mixing unit 112 from the base fluid source 104. Examples of the pump 108 include, but are not limited to, a centrifugal pump, a positive displacement pump, a screw pump, and a rotary lobe pump. The pump 108 may be operable to either receive or draw in the base fluid 106 from the base fluid source 204 and provide the base fluid 106 to the mixing unit 112. By way of nonlimiting example, the volumetric flow rate of the base fluid 106 through the mixing unit 112 may be at least about 50 gallons per minute (gpm) (0.19 $m^3$/min), or within a range such as about 50 gpm to about 200 gpm (0.76 $m^3$/min), or about 75 gpm (0.28 $m^3$/min) to about 175 gpm (0.66 $m^3$/min), or about 100 gpm (0.38 $m^3$/min) to about 150 gpm (0.57 $m^3$/min). In some embodiments, the maximum flow rate of the system 100 as a whole is about 2400 gmp.

The motor 110 used in the system 100 may include various types or configurations capable of suitably powering the pump 108. In some embodiments, the motor 110 may include a totally enclosed fan cooled (TECF), three phase, explosion proof motor capable of outputting 200 hp at 1800 rpm with 480V and 60 Hz. The motor 110 may alternatively be able to output 200 hp at 1800 rmp with 380V and 50 Hz.

The mixing unit 112 may include one or more continuous and/or batch mixing devices, such as an agitator, a mixer, a venturi mixing device, a jet pump, an eductor, an extender, a blender, a static mixer, or any combination thereof.

The system 100 may further include a hopper 114 in fluid communication with the mixing unit 112. The hopper 114 may be arranged and otherwise configured to deliver one or more additives 116 to the mixing unit 112 to be mixed and/or blended with the base fluid 106. A working fluid 118, alternately referred to as an "extenuated fluid," is then discharged from the mixing unit 112. The additive 116 may be in the form of a powder, fine granules, or a liquid (e.g., a concentration, a suspension, an emulsion, a slurry, etc.) and may be fed to the mixing unit 112 by any suitable method such as gravity, vacuum, agitation, vibration, auger, feeder, or any combination thereof. In embodiments where the additive 116 is a powder or fine granules, the additive 116 may be stored under humidity control in which one or more desiccant filters removes ambient moisture to prevent aggregation and caking.

The dosage rate of the additive 116 to the mixing unit 112 may vary depending on the application and depending on what type of working fluid 118 is desired. More specifically, in some embodiments, the rate at which the additive 116 is introduced into the mixing unit 112 may be controlled by volume or weight to accord with a corresponding dosage rate of the base fluid into the mixing unit 112. Control over the dosage rate may be done by any suitable mechanism, including use of a feeder (e.g., an auger) or a valve operatively coupled to the hopper 114 and otherwise interposing the hopper 114 and the mixing unit 112. In some embodiments, the additive 116 may be added at a rate such that the fluid output of the mixing unit 112 includes concentrations of the additive 116 of at least about 100 ppm, at least about 200 ppm, or at least about 400 ppm.

Example additives 116 include, but are not limited to, rheological modifiers, viscosifiers, flow modifiers, scale inhibitors, corrosion inhibitors, biocides, surfactants, iron control agents, polymer breakers, and other powdered chemical products used in liquid applications. In some embodiments, one or more additives 116 may include natural and derivatized hydratable polymers, such as polysaccharides, biopolymers, and other polymers. Polymeric additives 116 may have a molecular weight of 10,000 g/mol to 50,000,000 g/mol or greater. Examples of polymers that may be used include, but are not limited to, arabic gums, cellulose, modified celluloses, and cellulose derivatives that may include cellulose ethers, esters, and the like, karaya gums, xanthaii, tragacanth gums, ghatti gums, carrageenin, *psyllium*, acacia gums, tamarind gums, guar gums, locust bean gums, derivatives thereof, and the like. In some embodiments, galactomanans such as guar, including natural, modified, or derivative galactomanans, may be used. In some embodiments, the additive 116 may include a synthetic polymer or copolymers such as polyacrylate, polymethacrylate, acrylamide-acrylate copolymers, acrylamide homopolymers and copolymers (i.e., polyacrylamides), maleic anhydride methylvinyl ether copolymers, and any combination thereof. In some embodiments, the additive 116 may include a hydratable clay such as, but not limited to, bentonite, attapulgite, sepiolite, montmorillonite, laponite, and the like.

In some embodiments, the system 100 may include a secondary source 120 that includes a secondary additive 122 that may be introduced to the mixing unit 112. The secondary source 120 may comprise, for example, a second hopper, similar to the hopper 114, but could alternatively comprise a container housed within or without the container enclosure 102 and placed in fluid communication with the mixing unit 112. In embodiments that include the secondary source 120, the secondary additive 122 may be added to the mixing process to help form direct or invert emulsions, and the like. Accordingly, the secondary additive 122 may comprise a supplemental base fluid component, a fluidized additive, a liquid, a gel, a slurry, or an immiscible liquid. In other embodiments, or in addition thereto, the secondary additive 122 may be the same as or similar to the additive 116, without departing from the scope of the disclosure. In at least one embodiment, the secondary additive 122 may be drawn into the mixing unit 112 under vacuum generated within the mixing unit 112, as described in more detail below. Alternatively, the secondary additive 122 may be pumped into the mixing unit 112 under positive pressure, without departing from the scope of the disclosure.

Following the blending process undertaken in the mixing unit 112, the working fluid 118 may be discharged from the system 100 and conveyed to a downstream location 124. In some embodiments, the downstream location 124 may comprise a storage tank or a transport tank mounted to a vehicle for transport. In other embodiments, the downstream location 124 may comprise subsequent processing for the working fluid 118. In yet other embodiments, the downstream location 124 may comprise an application or operation that directly puts the working fluid 118 to work, such as introducing (injecting) the working fluid 118 downhole to facilitate one or more downhole operations. Example downhole operations include, but are not limited to, drilling, lubrication, hydraulic fracturing (or "fracking"), mitigating downhole fluid loss, and the like. In a hydraulic fracturing operation, the working fluid 118 comprises a hydraulic fracturing fluid that is injected directly downhole or mixed with proppant for use in creating and/or extending at least one fracture in subterranean formations. Alternatively, or in addition thereto, the working fluid 118 may be used as a carrier fluid.

The system 100 also includes suitable plumbing (e.g., pipes, conduits, hoses, etc.) and connectors (couplings) that fluidly couple the various fluid components of the system 100. Moreover, the system 100 may further include one or more valves operable to control fluid flow through the plumbing of the system 100 and between various components parts. Such valves may be manually operated (actuated), or may alternatively be automated. The system 100 may also include various sensors, gauges, and monitoring devices, collectively referred to herein as "sensors 126," configured to monitor operational parameters of the system 100. Example sensors 126 that may be included in the system 100 include, but are not limited to, a temperature sensor, a pressure sensor (e.g., a vacuum sensor, a differential pressure sensor, etc.), a flow meter, a viscometer, a scale (e.g., to measure weight of materials, etc.), a weigh bridge, radar (e.g., free wave or guided wave radar), or any combination thereof.

In some embodiments, the system 100 may be partially or fully automated, thus enabling remote or automated operation of the system 100. In such embodiments, the system 100 may include a control unit 128 that may be accessed (either wired or wirelessly) from a remote location, such as through satellite or Internet connections using a computer, a laptop, a handheld computing device, or the like. The control unit 128 may be a computer or computer system in communication (either wired or wireless) with one or more of the motor 110, the mixing unit 112, a feeder for the hopper 114, the valves, and the sensors 126. The control unit 128 may be programmed to communicate with such components to monitor operation of the system 100 and maintain operation thresholds within predetermined limits. Examples of controlling the system 100 may include adjusting flow rates of fluids at various locations within the system 100. For example, the control unit 128 may be programmed to monitor and control vacuum and pressure instrumentation, such as the operation of the pump 108 or one or more valves. In such embodiments, the control unit 128 may be programmed to monitor and regulate flow rates within the system 100 at various points to ensure the concentration of the additive 116 (and/or the secondary additive 122) and the production rate of the working fluid 118 are within acceptable ranges. Another example of controlling the system 100 may include temperature controlled operation of valves and/or the speed of the pump 108, or controlling operation of the pump 108 based on weight.

The control unit 128 may also serve as an access point for monitoring operations and video surveillance of various functions. In some embodiments, based on data obtained by the sensors 126, the control unit 128 may be programmed to alert a user when an operational parameter of the system 100 exceeds a predetermined limit. In other embodiments, the control unit 128 may be configured to control fluid flow based on temperature and/or pressure. In such embodiments, the control unit 128 may be programmed to stop operation of the motor 110 based on temperature and/or pressure or fluid supply tank weight. Moreover, operation of the motor 110 may be controlled once a predetermined weight of finished product is achieved. In yet other embodiments, the control unit 128 may be configured to control the injection of the additives 116, 122.

Figure 2A:
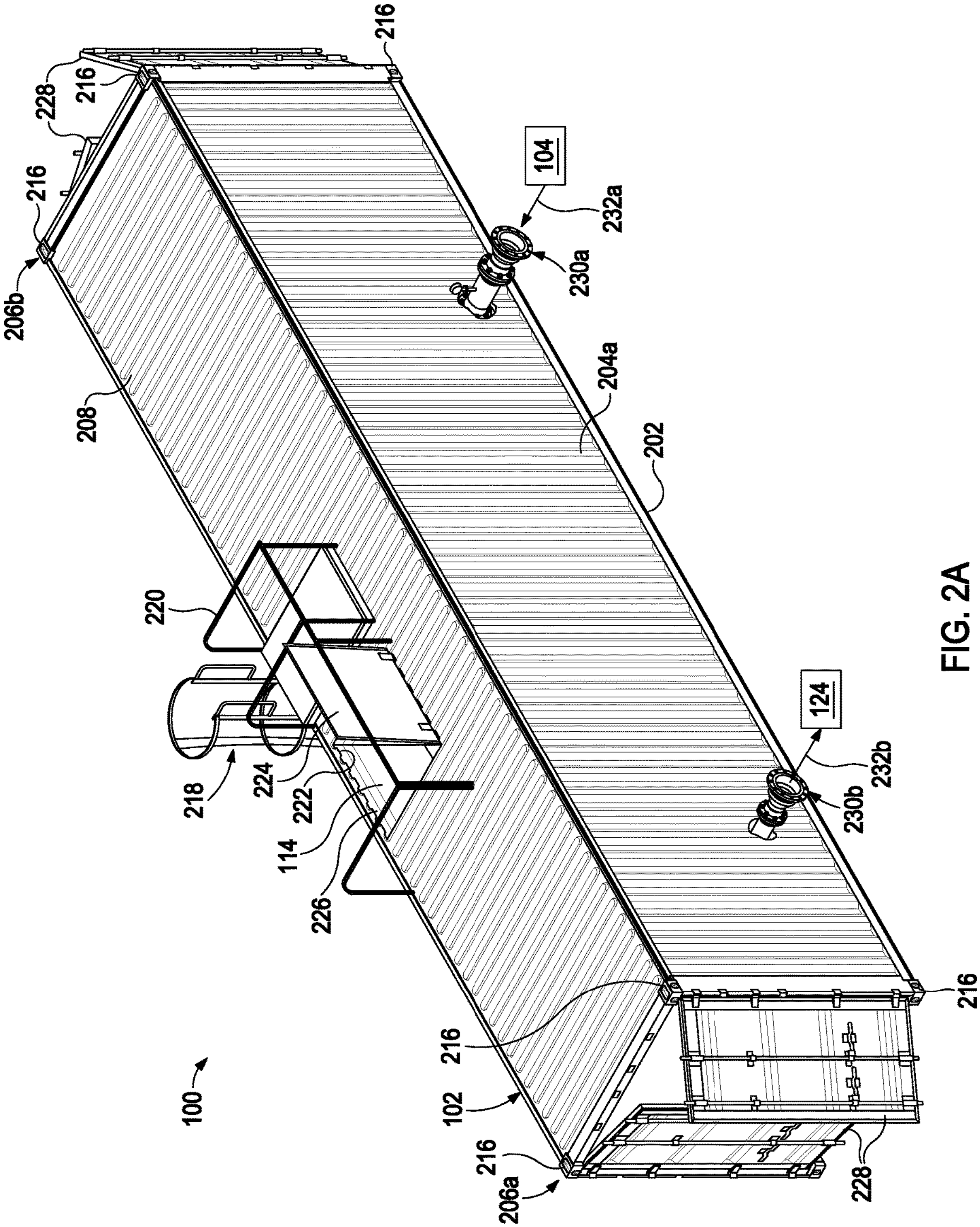
FIGS. 2A and 2B are isometric front and back views, respectively, of one example of the transportable blending system of FIG. 1, according to one or more embodiments.
Figure 2B:
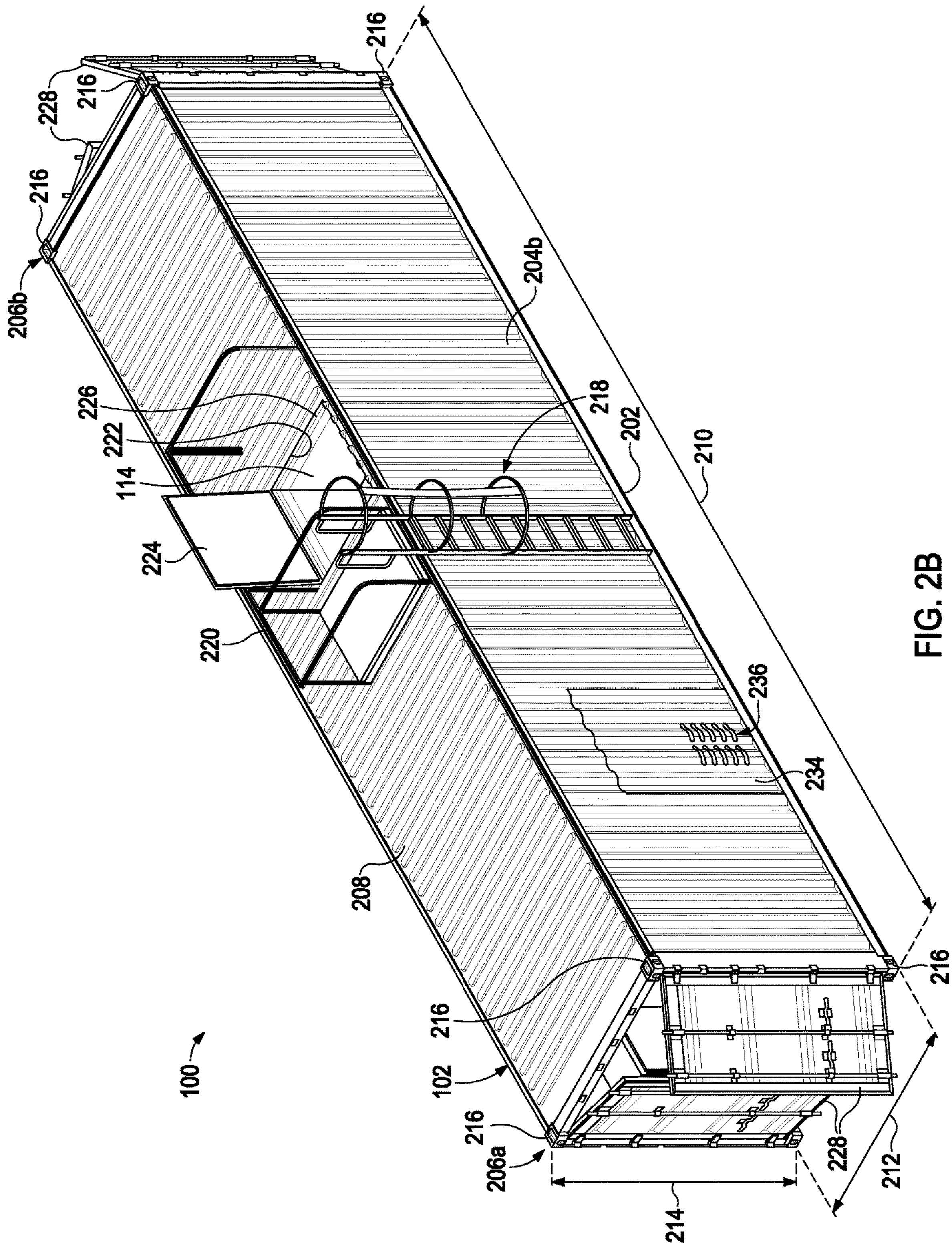

FIGS. 2A and 2B are isometric front and back views, respectively, of one example of the transportable blending system 100, according to one or more embodiments. As illustrated, the container enclosure 102 may be a substantially rectangular structure that includes a base 202, opposing first (front) and second (back) sidewalls 204*a* and 204*b*, opposing first and second ends 206*a* and 206*b*, and a roof 208.

In some embodiments, the container enclosure 102 may comprise an intermodal shipping container, such as a standardized ISO container that is compliant with universal shipping dimensions and configurations as dictated by the International Organization for Standardization (ISO). More particularly, and with reference to FIG. 2B, the container enclosure 102 may exhibit a length 210, a width 212, and a height 214 that complies with ISO universal standards and configurations such that the container enclosure 102 is able to take advantage of the global containerized intermodal freight transport system. As a result, the container enclosure 102 may be moved from one mode of transport to another, such as from ship, to rail, to truck, etc., without requiring unloading and reloading of the contents disposed within the container enclosure 102.

In accordance with ISO standards, the width 212 of the container enclosure 102 may be 8 feet (2.438 meters). In some embodiments, the container enclosure 102 may exhibit a length 210 of about 20 feet (i.e., 19 feet and 10.5 inches; 6.058 meters). In other embodiments, however, the length 210 of the container enclosure 102 may be 40 feet (12.192 meters). Moreover, in some embodiments, the height 214 of the container enclosure 102 may be 8 feet (2.438 meters). In other embodiments, however, the container enclosure 102 may be characterized as a "high-cube" container, which exhibits a height 214 of 9 feet and 6 inches (2.896 meters without departing from the scope of the disclosure.

In accordance with ISO container specifications, the container enclosure 102 may further include castings 216 at each corner (eight in total) that are used to stack and secure multiple container enclosures 102 atop one another. Each casting 116 may include appropriate openings configured to receive twistlock fasteners (not shown), or the like, that allow a second container enclosure (not shown) to be placed atop the depicted container enclosure 102 and be suitably coupled thereto. Accordingly, two or more container enclosures 102 may be stacked atop one another and secured together at the castings 216.

In some embodiments, the container enclosure 102 may include a vertical telescoping ladder 218 removably secured to the back sidewall 204*b* and used to access the roof 208. For safety, in some embodiments, the container enclosure 102 may also include a handrail 220 removably secured to the roof 208. As illustrated, an opening 222 may be defined in the roof 208 to facilitate access to the hopper 114 within the interior of the container enclosure 102. Accordingly, an inlet to the hopper 114 may be aligned or substantially aligned with the opening 222. An access hatch 224 may be pivotable between open and closed positions to occlude or expose the opening 222. During operation of the system 100, the additive 116 (FIG. 1) may be introduced into the hopper 114 via the opening 222. Additives 116 can be conveyed into the hopper 114 by manual addition (e.g., from a sack or container), pneumatics (e.g., a pneumatic blower), conveyor, screw feeder, or any combination thereof.

In some embodiments, a portion of the hopper 114 (e.g., the top) may be hermetically or otherwise substantially sealed to the roof 208 at the opening 222. In such embodiments, one or more seals 226 may interpose the top of the hopper 114 and the underside of the roof 208. The seals 226 may be carried by one or both of the hopper 114 or the underside of the roof 208, but could alternatively be installed independent of either structure. The sealed interface may help prevent dust or debris generated or accumulated while conveying the additive 116 into the hopper 114 from migrating into the interior of the container enclosure 102. This may prove advantageous in maintaining the interior of the container enclosure 102 clean of dust, debris, or other contamination introduced via the opening 222, which could, over time, adversely affect some of the mechanical and/or electrical components housed within the container enclosure 102. Preventing dust or debris from migrating into the interior of the container enclosure 102 may also prove advantageous in preventing the injection or inhalation of such airborne particulates by operators present within the container enclosure 102. Moreover, eliminating or reducing dust or debris accumulation within the container enclosure 102 may also mitigate explosive conditions, depending on the materials being processed.

In some embodiments, one or both ends 206*a,b* of the container enclosure 102 may include one or more doors 228, such as pivotable double doors. In the illustrated embodiment, the doors 228 are located at each end 206*a,b*. Having doors 228 at each end 206*a,b* of the container enclosure 102 allows easy access to the interior from both ends 206*a,b*, thus an operator is not required to traverse the entire interior length of the container enclosure 102 from one end 206*a,b* to locate an interior component arranged at or near the opposing end 206*a,b*. Moreover, including doors 228 at each end 206*a,b* may help facilitate efficient air circulation through the container enclosure 102, from one end 206*a* toward the other 206*b*, which helps reduce air contamination and promotes heat expulsion during operation. Including the doors 228 at each end 206*a,b* also allows immediate access to manual valves that may have to be manipulated during operation.

As best seen in FIG. 2A, the system 100 may also include an inlet manifold 230*a* and a discharge manifold 230*b* penetrating the front sidewall 204*a*. The inlet manifold 230*a* may include a flange or fluid coupling configured to fluidly couple the system 100 to a conduit 232*a* extending from the base fluid source 104. The conduit 232*a* conveys the base fluid 106 (FIG. 1) to the system 100 and, more particularly, to the mixing unit 112 (FIG. 1) via the pump 108 (FIG. 1), as generally described above. The discharge manifold 230*b* may include a flange or fluid coupling configured to fluidly couple the system 100 to a conduit 232*b* to convey the working fluid 118 (FIG. 1) from the system 100 to the downstream location 124 (FIG. 1), as generally described above. While the inlet and discharge manifolds 230*a,b* are shown penetrating the front sidewall 204*a,b*, those skilled in the art will readily appreciated that the inlet and discharge manifolds 230*a,b* could alternatively penetrate either of the sidewalls 204*a,b*, the ends 206*a,b*, the base 202, or the roof 208, without departing from the scope of the disclosure.

In some embodiments, as best seen in FIG. 2B, the container enclosure 102 may further include a side maintenance panel 234 removably coupled to the back sidewall 204*b*. The side maintenance panel 234 provides entry into the interior of the container enclosure 102 to access one or both of the pump 108 and the motor 110. Accordingly, the side maintenance panel 234 may be laterally aligned with and otherwise laterally adjacent the pump 108 and the motor 110 within the container enclosure 102. In some embodiments, the dimensions of the side maintenance panel 234 may be large enough to facilitate lateral removal of one or both of the pump 108 and the motor 110 through the side maintenance panel 234. In such embodiments, the pump 108 or the motor 110 may be easily accessed and removed via a forklift penetrating the back sidewall 204*b* via the side maintenance panel 234. Moreover, the side maintenance panel 234 may further include one or more vents 236 defined therein to promote ventilation of the interior of the container enclosure 102, especially for the motor 110.

Figure 3:
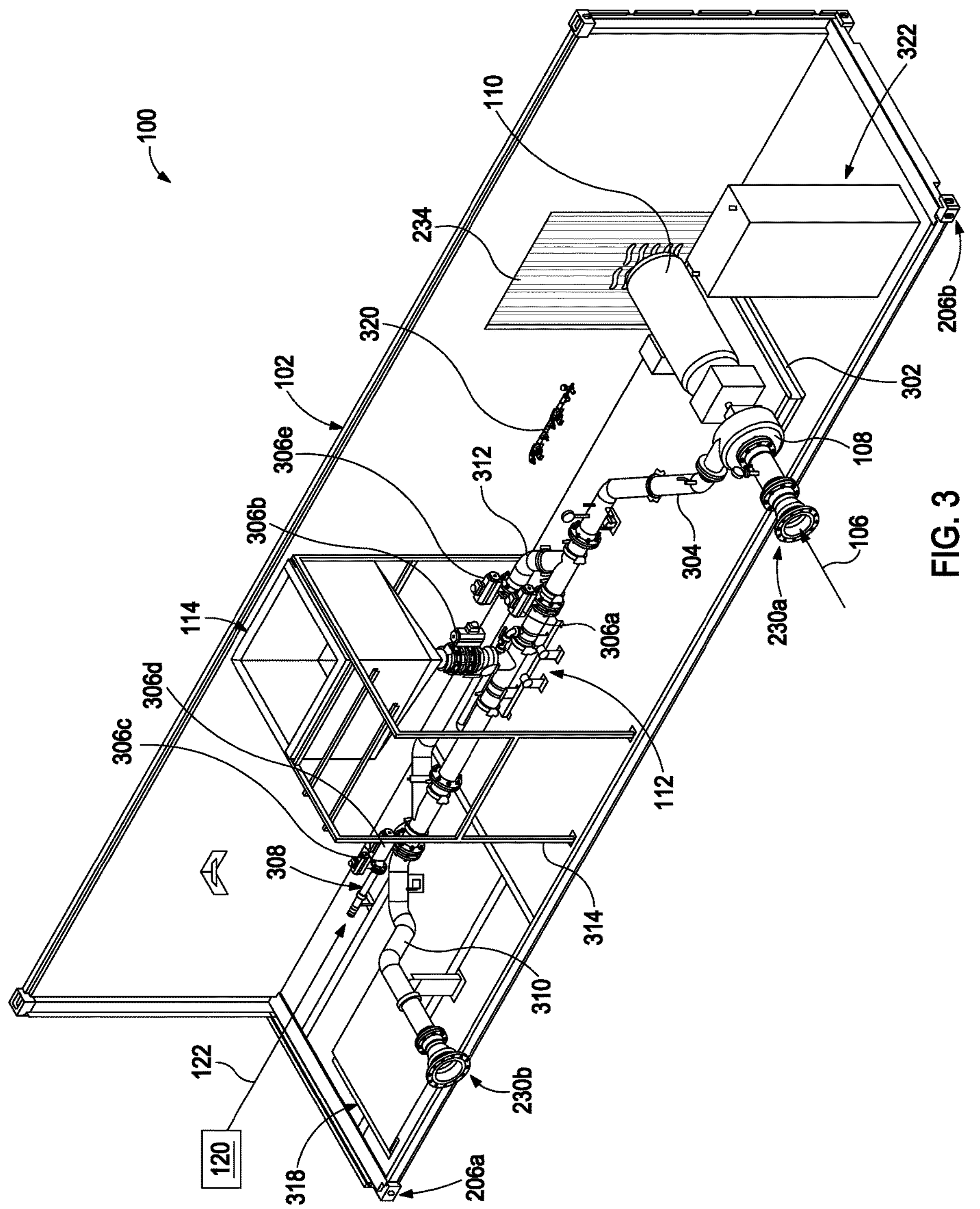
FIG. 3 is an enlarged, isometric view of the interior of the container enclosure of FIGS. 1 and 2A-2B, according to one or more embodiments.
Figure 4:
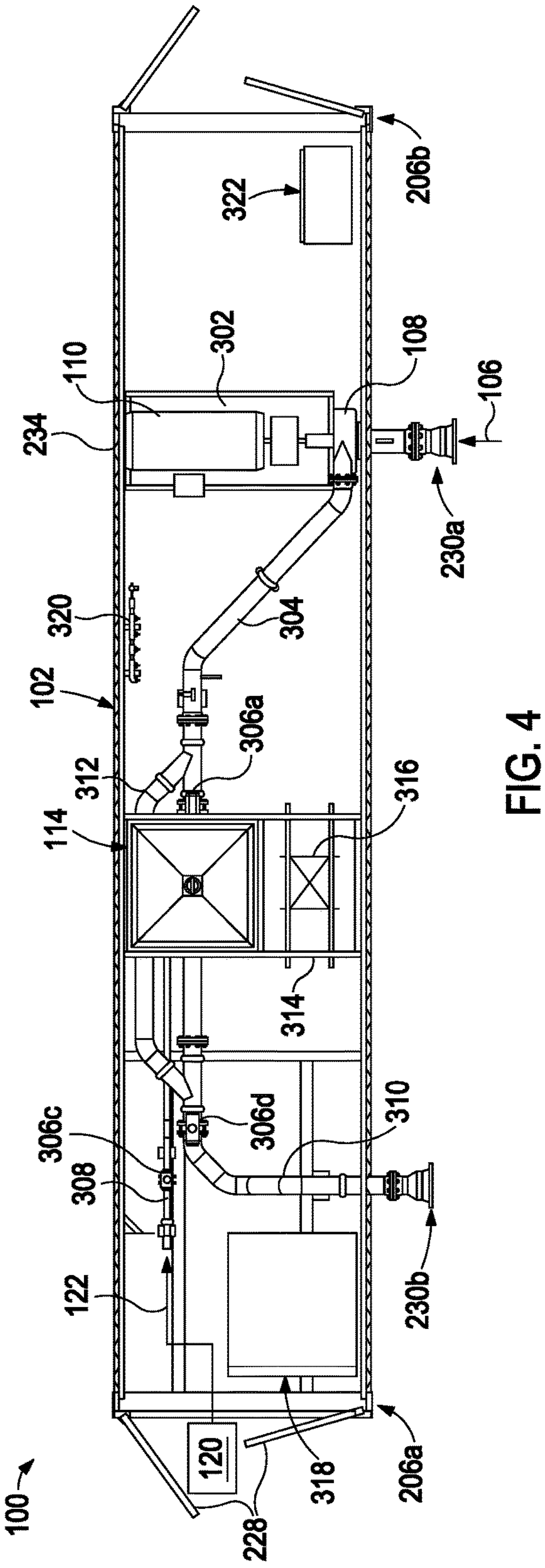
FIG. 4 is an enlarged, top view of the interior of the container enclosure of FIGS. 1 and 2A-2B, according to one or more embodiments.
Figure 5:
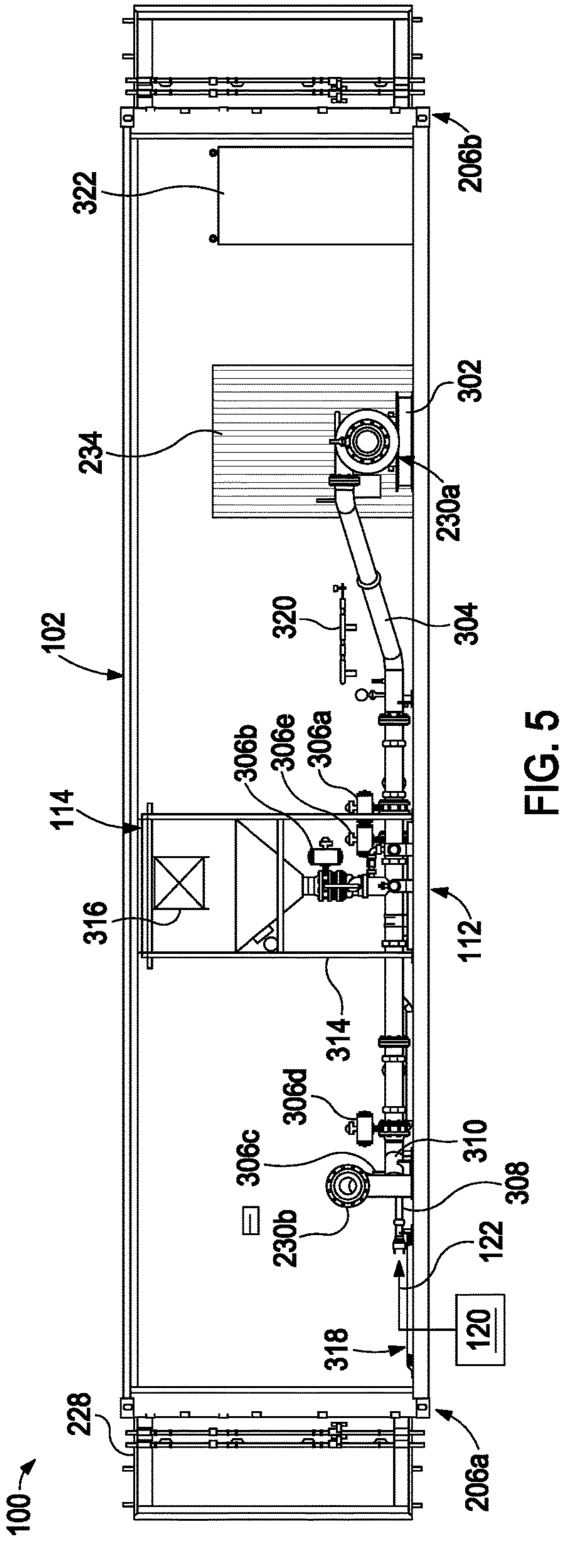
FIG. 5 is an enlarged front view of the interior of the container enclosure of FIGS. 1 and 2A-2B, according to one or more embodiments.

FIGS. 3-5 show various interior views of the container enclosure 102 of the system 100 of FIG. 1, according to one or more embodiments. More specifically, FIG. 3 is an enlarged, isometric view of the interior of the container enclosure 102, FIG. 4 is an enlarged, top view of the interior of the container enclosure 102, and FIG. 5 is an enlarged front view of the interior of the container enclosure. As shown in FIGS. 3-5, the motor 110 is arranged to drive the pump 108 and thereby receive the base fluid 106 from the base fluid source 104 (FIG. 1) via the inlet manifold 230*a*. As illustrated, the pump 108 and the motor 110 may be coaxially aligned and arranged perpendicular or substantially perpendicular to the lengthwise direction of the container enclosure 102. The pump 108 and the motor 110 may also be aligned with the side maintenance panel 234 to enable one or both of the pump 108 and the motor 110 to be laterally removed from the container enclosure 102 via the side maintenance panel 234. In some embodiments, one or both of the pump 108 and the motor 110 may be mounted to a skid 302, which may be removed laterally from the container enclosure 102 via the side maintenance panel 234. This may enable an operator to easily replace or perform maintenance on the pump 108 or the motor 110. In other embodiments, however, one or both of the pump 108 and the motor 110 may alternatively be directly coupled to the floor of the container enclosure 102.

The pump 108 conveys the base fluid 106 to the mixing unit 112 via an intake manifold 304 extending between the pump 108 and the mixing unit 112. In some embodiments, a first valve 306*a* may be arranged in the intake manifold 304 and may be operable to control the flow of the base fluid 106 to the mixing unit 112. The hopper 114 may be arranged above the mixing unit 112 and otherwise positioned to convey the additive(s) 116 directly into the mixing unit 112 to be mixed and/or blended with the base fluid 106. In some embodiments, a second valve 306*b* may be arranged between the discharge of the hopper 114 and the mixing unit 112 to selectively regulate the flow of the additive 116 into the mixing unit 112.

In some embodiments, the secondary source 120 may be fluidly coupled to the mixing unit 112 via a secondary manifold 308 to convey the secondary additive 122 into the mixing unit 112 as desired. Flow of the secondary additive 122 through the secondary manifold 308 may be selectively regulated with a third valve 306*c* arranged in the secondary manifold 308.

The working fluid 118 is discharged from the mixing unit 118 and conveyed to the discharge manifold 230*b* via a working fluid manifold 310 extending between the mixing unit 118 and the discharge manifold 230*b*. In some embodiments, a fourth valve 306*d* may be arranged in the working fluid manifold 310 and configured to selectively regulate the flow of the working fluid 118 being conveyed to the discharge manifold 230*b*.

In at least one embodiment, the system 100 may further include a bypass manifold 312 extending between the intake and working fluid manifolds 304, 310. The bypass manifold 312 provides a conduit that allows some or all of the base fluid 106 to flow around and otherwise "bypass" the mixing unit 112. Diverting the base fluid 106 around the mixing unit 112 via the bypass manifold 312 may be desired, for example, to enable maintenance or cleaning of the mixing unit 112. Diverting the base fluid 106 around the mixing unit 112 via the bypass manifold 312 may also be desired to maintain continuous circulation of the base fluid 106. Alternatively, or in addition thereto, diverting some or all of the base fluid 106 around the mixing unit 112 via the bypass manifold 312 may be desired to dilute fluid formulations from the mixing unit 112 to generate staged or gradient treatments.

In yet other embodiments, the bypass manifold 312 may be useful and otherwise advantageous to protect the integrity of the fluids passing through the mixing unit 112. For example, the mixing unit 112 may include an eductor jet, as described in more detail below, and as the fluids travel through the eductor jet, the fluids can be sheared. The shearing effect introduces heat into the fluids, which can be bad for some fluid compositions. The bypass manifold 312 allows the system to continuously circulate the fluids without the introduction of shear or heat in the fluid stream. It also provides a safety mechanism during automated control if the eductor jet was to become clogged or blocked. In such embodiments, the control unit 128 could be programmed to redirect flow to the bypass manifold 312 to prevent over pressure, dead heading, or over temperature scenarios. Another advantage of the bypass manifold 312 is that it allows lower current limits to the electrical system during start-up operations when fluid is present in the system.

In some embodiments, a fifth valve 306*e* may be arranged in the bypass manifold 312 and configured to selectively regulate flow of the base fluid 106 through the bypass manifold 312. In one or more embodiments, the first and fifth valves 306*a,e* may be operated together to ensure desired flow rates of the base fluid 106 though the mixing unit 112 and the bypass manifold 312. In at least one embodiment, for example, the first valve 306*a* may be shut off completely, and the fifth valve 306*e* may be opened partially or completely to allow the base fluid 106 to flow only through the bypass manifold 312. In other embodiments, both the first and fifth valves 306*a,e* may be opened fully or throttled (i.e., opened partially) to allow a predetermined amount of the base fluid 106 through the mixing unit 112 and the bypass manifold 312.

In some embodiments, the hopper 114 may be supported within the container enclosure 102 on a support assembly 314. In at least one embodiment, as illustrated, the hopper 114 may be located at a central location within the container enclosure 102 to provide equal weight distribution during transport. As best seen in FIGS. 4 and 5, in some embodiments, the system 100 may further include a fan 316 arranged within the container enclosure 102 and supported on the support assembly 314. The fan 316 may be configured to move air lengthwise through the container enclosure 102 to cool the machinery and remove dust and air particulates from the interior of the container enclosure 102. In other embodiments, however, the fan 316 may be located at any other location within the container enclosure 102.

In some embodiments, the system 100 may further include a scale 318 arranged within the container enclosure 102 at or near one of the ends; e.g., the first end 206*a*. The scale 318 may be accessible through the doors 228 located at the first end 206*a*. The scale 318 may be used to weigh and quantify additives and other fluid components. In some embodiments, the scale 318 may include a weighing deck incorporating one or more weigh cells.

In some embodiments, the system 100 may further include an air manifold 320. In some embodiments, the air manifold 320 may be located on the wall between the hopper 114 and the side maintenance panel 234. The air manifold 320 may be used to supply pressurized air to any air actuated valves in the system 100. When connected to an external air source, the air manifold 320 may be configured to supply such valves with a pressure regulated air supply. In at least one embodiments, however, the system 100 may further include an air compressor (not shown) configured to be communicably coupled to the air manifold 320 and operable to provide a steady supply or pressurized air to the air manifold 320.

In some embodiments, a control panel 322 may be located within the container enclosure 102 at or near one of the ends 206*a,b*. In the illustrated embodiment, the control panel 322 is located at the second end 206*b*, opposite the location of the scale 318. Locating the control panel 322 near the second end 206*b* may allow easy access to the control panel 322 via the doors 228 located at the second end 206*b*. The control panel 322 may house the electronics and electrical components required to operate the system 100. As mentioned above, the system 100 may include the control unit 128 (FIG. 1), and the control unit 128 may also be housed within the control panel 322. In at least one embodiment, the control unit 128 may include a user interface that allows an operator to operate the system 100 from within the container enclosure 102.

As described above, the control unit 128 (FIG. 1) may also be used to facilitate partial or full automation of the system 100. In such embodiments, the control unit 128 may be communicably coupled (either wired or wirelessly) to the some or all of the electrical and/or electromechanical components of the system 100 including, but not limited to, the motor 110, the mixing unit 112, the hopper 114, the valves 306*a-e*, the fan 316, the scale 318, the air manifold 320, and the sensors 126 (FIG. 1). The valves 306*a-e*, for example, may comprise valves capable of actuating between open and closed positions based on a signal received from the control unit 128; e.g., electromechanical valves, electronic valves, air pressure actuated valves, hydraulic valves, etc. The control unit 128 may also include or otherwise incorporate communication means (e.g., transmitters, receivers, etc.) to enable an operator to remotely operate the system 100 using any computing device capable of connecting to the control unit 128. When connected to the internet, the control unit 128 may also provide remote troubleshooting and equipment monitoring.

Figure 6:
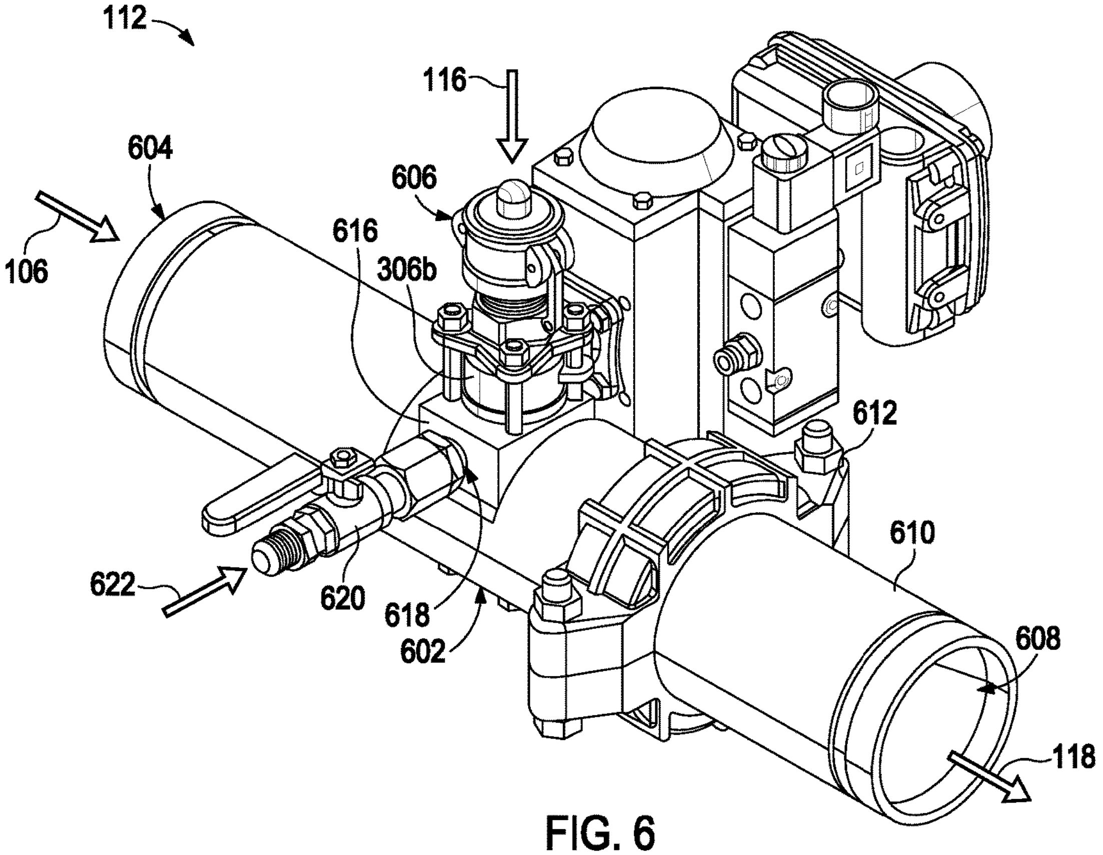
FIG. 6 is a cross-sectional side view of one example of the mixing unit of FIGS. 3-5, according to one or more embodiments.

FIG. 6 is a cross-sectional side view of one example of the mixing unit 112, according to one or more embodiments. As illustrated, the mixing unit 112 may include an extender 602 having a fluid inlet 604, an additive inlet 606, and an outlet 608.

The base fluid 106 may be introduced into the extender 602 via the fluid inlet 604, and the additive 116 may be introduced into the extender 602 via the additive inlet 606. As described above, the additive 116 may be fed into the additive inlet 606 from the hopper 114 (FIGS. 3-5). The working fluid 118 may exit the extender 602 via the outlet 608 to be conveyed to the downstream location 124 (FIG. 1), as generally described above.

The geometry of the extender 602 may cause the base fluid 106 to form a jet that flows through the extender 602 and generates a low-pressure vacuum that draws the additive 116 into the mixing device 106 to mix with the base fluid 106. The formation of the jet also imparts energy to the mixture to help hydrate the additive 116.

In some embodiments, the outlet 608 may be formed by a diffuser 610 coupled to the extender 602 at a coupling 612. In other embodiments, however, the diffuser 610 may form an integral part or extension of the extender 602.

As discussed above, the additive inlet 606 may include the second valve 306*b* to regulate flow of the additive 116 into the mixing unit 112 and, more particularly, into the extender 602. The second valve 306*b*, referred to herein as the "additive valve 306*b*," may comprise, for example, a ball valve that may be manually operated or operated by automation using the control unit 128 (FIG. 1). In the illustrated embodiment, the additive inlet 606 may further include a spacer 616 interposing the additive valve 306*b* and the extender 602. The spacer 616 may define a flush port 618 and a flush valve 620 may be fluidly coupled to the spacer 616 at the flush port 618. The flush valve 620 may be actuated as needed to introduce a flushing fluid 622 into the extender 602 to remove any buildup of the additive 116 that may be coated on the inner walls of the spacer 616 and a suction port that feeds the additive 116 into the extender 602. Similar to the additive valve 306*b*, the flush valve 620 may be manually operated or operated by automation using the control unit 128.

When it is desired to flush the system, the additive valve 306*b* may be closed (either manually or automated), and the flush valve 620 may be opened (either manually or automated) to allow the flushing fluid 622 to enter the spacer 616 and the extender 602. The flushing fluid 622 may be any fluid that may sufficiently remove built-up additive 116 including, but not limited to, water (e.g., fresh or salt), a gas (e.g., air, nitrogen, carbon dioxide, etc.), a hydrocarbon (e.g., ethanol, methanol, etc.), or any combination thereof. In at least one embodiment, the flushing fluid 622 may comprise a portion of the base fluid 106 separated from the main portion and piped to the flush valve 620.

Figure 7:
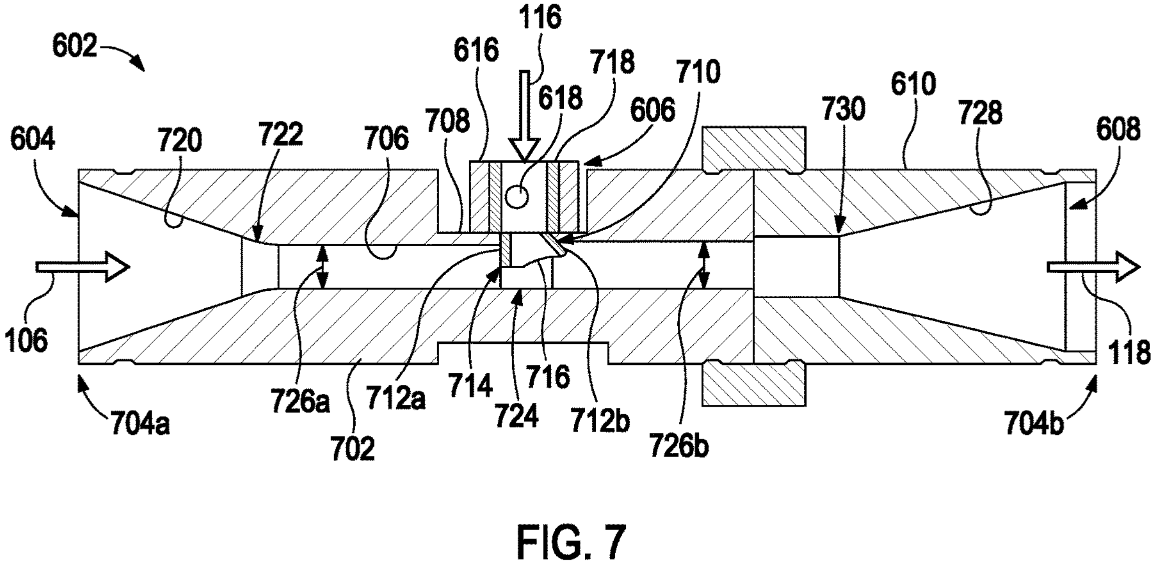
FIG. 7 is a cross-sectional side view of a nonlimiting embodiment of the extender of FIG. 6.

FIG. 7 is a cross-sectional side view of a nonlimiting embodiment of the extender 602. As illustrated, the extender 602 includes an elongate body 702 having a first end 704*a* and a second end 704*b*. The fluid inlet 604 is provided at the first end 704*a*, the outlet 608 is provided at the second end 704*b*, and a throat 706 extends between the fluid inlet 604 and the outlet 608. In some embodiments, the extender 602 may be made of a metal, such as carbon steel, stainless steel (e.g., polished stainless steel, chrome plated steel, etc.), aluminum, any alloys thereof, or any combination thereof. Alternatively, the extender 602 may be made of a plastic or polymer, such as polytetrafluoroethylene (PTFE or TEFLON®), NYLON®, HYLON®, polyvinyl chloride (PVC), chlorinated polyvinyl chloride (CPVC), or any combination thereof. In one or more embodiments, a hydrophobic coating may be applied to the inner walls of some or all of the extender 602. In yet other embodiments, the inner walls of some or all of the extender 602 may be polished to reduce friction.

Only a portion of the additive inlet 606 is depicted in FIG. 7. More particularly, the additive valve 306*b* (FIG. 6) is omitted, but the spacer 616 is depicted and defines the flush port 618 through which the flushing fluid 622 (FIG. 6) can be injected into the extender 602. In the illustrated embodiment, a recessed portion or "cutout" 708 is defined in the outer wall of the body 702, and the additive inlet 606 may be secured to the extender 602 within the cutout 708. Mounting the additive inlet 606 to the extender 602 within the cutout 708 helps to mitigate the occurrence of the additive 116 coating (covering) the inner walls of the additive inlet 606.

The additive inlet 606 may further include a suction port 710 that extends from the spacer 616 and communicates with the extender 602 at an intermediate point between the first and second ends 704*a,b*. In at least one embodiment, as illustrated, the suction port 710 may extend into the throat 706 of the extender 602. In such embodiments, the suction port 710 may be generally cylindrical and may expand or otherwise flare outward as it extends into the throat 706. The diameter of the suction port 710 at or near the spacer 616 may be smaller than the diameter of the suction port 710 at its opposing end within the throat 706. This may prove advantageous in providing a larger discharge area for the additive 116 to be combined with the base fluid 106 flowing through the throat 706.

In some embodiments, a leading (upstream) edge 712*a* of the suction port 710 may extend deeper (further) into the throat 706 as compared to a trailing (downstream) edge 712*b* of the suction port 710. This may prove advantageous in helping to prevent the incoming additive 116 from rebounding off the jet of base fluid 106 flowing through the throat 706 and splashing back onto portions of the suction port 710. Moreover, in at least one embodiment, the leading edge 712*a* may define or provide a beveled bottom edge 714 and the suction port 710 may define a chamfered portion 716 that facilitates the transition between the leading and trailing edges 712*a,b*. The beveled bottom edge 714 and the chamfered portion 716 may be designed to help minimize or prevent splashing of the additive 116 as it is introduced into the throat 706.

In some embodiments, the suction port 710 may be made of a metal, such as carbon steel, stainless steel (e.g., polished stainless steel, chrome plated steel, etc.), aluminum, any alloys thereof, or any combination thereof. Alternatively, the suction port 710 may be made of a plastic or a polymer, such as polytetrafluoroethylene (PTFE or TEFLON®), NYLON®, HYLON®, polyvinyl chloride (PVC), chlorinated polyvinyl chloride (CPVC), or any combination thereof. In yet other embodiments, or in addition thereto, all or a portion of the spacer 616 and the suction port 710 may be lined with a lubricious material 718, such as CPVC. The lubricious material 718 may help repel the additive 116 and help facilitate a cleaner flushing when the flush port 618 is used to introduce the flushing fluid 622 (FIG. 6) to remove any buildup of the additive 116 that may be coated on the inner walls of the spacer 616 and the suction port 710. In at least one embodiment, the lubricious material 718 may further line the inner walls of the additive valve 306*b* (FIG. 6).

In embodiments that include flushing capabilities, the extender 602 may be cleaned and flushed at periodic intervals, such as at every 20 minutes of operation, or every 30 minutes, every hour, etc. In such embodiments, the control unit 128 (FIG. 1) may autonomously control operation of the flushing operations. The control unit 128 may also use various flow and pressure measurements to ensure that the extender 602 is maintaining suitable suction conditions. In the event any parameters deviate from normal values, the control unit 128 may cause the additive valve 306*b* (FIG. 6) to close to eliminate a backflush condition through the suction line, and initiate a flush of the extender 602.

The extender 602 may also be flushed before and/or after the mixing (blending) process is completed. Flushing the extender 602 prior to starting a mixing process may prove advantageous since if there is any additive 116 already built up on the inner walls of the extender 602 (e.g., the additive valve 306*b* of FIG. 6, the spacer 616, and the suction port 710), it will have already absorbed water and softened, thus making it much easier to flush it as opposed to a fresh build-up of the additive 116. In some embodiments, the entire fluid pressure force of the pump 108 (FIGS. 1 and 3-5) may be used in the flushing process.

The throat 706 may form an elongated passageway that helps elongate and unfold a polymer structure of the additive 116 with minimum damage. More specifically, the geometry of the extender 602 may help ensure that the base fluid 106 flowing through the throat 706 smoothly converges and mitigates splashing where the additive 116, especially dry additive 116, is introduced into the stream at the suction port 710. More particularly, the fluid inlet 604 may define or otherwise provide a converging portion 720 that tapers inward to form a nozzle. The base fluid 106 forms a jet as it is forced to transition from the converging portion 710 to the throat 706.

In some embodiments, the converging portion 720 may transition to the throat 706 at an arcuate transition 722 that exhibits a radius. As opposed to a sharp corner transition, the arcuate transition 722 provides smooth and curved transition walls. The radius and arcuate length of the arcuate transition 722 may be determined based on the remaining geometry of the extender 602. In at least one embodiment, the arcuate length of the arcuate transition 722 may be about 2.0 inches, but could alternatively be less than or greater than 2.0 inches, without departing from the scope of the disclosure. The arcuate transition 722 may help the flow of the base fluid 106 to become extensional and smooth, with little or no turbulence, as it forms the jet flowing into the throat 706, and smoother flow of the base fluid 106 may help prevent splashing as the additive 116 enters the throat 706 at the suction port 710.

During example operation, in some embodiments, opening of the additive valve 306*b* (FIG. 6) to introduce the additive 116 may be delayed for a short period (e.g., 5 or more seconds) to allow the flow of the base fluid 106 through the throat 706 to become extensional. Once proper conditions are attained, the additive valve 306*b* can be opened to start feeding the additive 116 and forming the working fluid 118.

In some embodiments, the diameter of the throat 706 may increase at or near the suction port 710 and otherwise where the additive 116 is introduced into the throat 706. More specifically, the throat 706 may define an expansion transition 724 that increases the diameter of the throat 706 in the downstream direction. Consequently, the diameter 726*a* of the throat 706 upstream from the expansion transition 724 may be smaller than the diameter 726*b* of the throat 706 downstream from the expansion transition 724. Increasing the diameter of the throat 706 at or near the suction port 710 may prove advantageous in removing the jet of base fluid 106 from the walls of the throat 706 at that point so that it does not impinge directly on abrupt structural edges of the suction port 710. The expansion transition 724 also provides additional room for the additive 116 to be introduced into the throat 706.

The diffuser 610 extends the length of the throat 706 and provides or otherwise defines a diverging portion 728 that tapers outward in the downstream direction. The throat 706 may transition to the diverging portion 728 at a transition 730. In some embodiments, as illustrated, the transition 730 may provide a sharp corner transition. In other embodiments, however, the transition 730 may provide a smooth, curved transition across an arcuate portion having a radius, without departing from the scope of the disclosure.

In a preferred embodiment, the additive 116 comprises a polymer, such as a polyacrylamide. The extensional flow generated by the extender 602 tends to keep the polymer structure of the additive 116 more intact, and tends to stretch the polymer without breaking it, thus improving its shear resistance and dynamic proppant transport capability. The mixing unit 112 (FIG. 6) may be able to produce a flow of the base fluid 106 with a minimum amount of wasted energy in the form of turbulence, and the additive 116 (e.g., polymer) is added to this stream. This allows the additive 116 to be wetted and then begin its structure development. The smooth, extensional flow pattern helps achieve elongation and unfolding of the polymer structure with a minimum of damage (e.g., shortening of the polymer chain).

In some embodiments, the downstream location 124 (FIG. 1) may comprise a hydration tank that also helps improve shear resistance and dynamic proppant transport capability in that it may keep the additive 116, which is now partially hydrated, in a constant but controlled movement (e.g., spiral flow). This step may complete the stretching of the polymer chains and maximize the area that the polymer structure covers. Combining these two blending steps may complete the required structural development process.

Maximizing the polymer concentration that is reached using this process allows the mixing device 106, 200 (FIGS. 1 and 2) to support a relatively high polymer concentration and, in turn, be capable of handling of the polymer requirement for a high injection rate through the downstream equipment 124 (FIG. 1).

Examples of hydrating polymers in accordance with the principles of the present disclosure can be found in U.S. Pat. No. 10,703,936, issued on Jul. 7, 2020, the contents of which are incorporated by reference in their entirety.

With reference again to FIG. 1, the control unit 128 may include an onboard computer system or may transmit data to an external computer system for processing and/or display of results. For the purposes of this disclosure, "coupled" as used herein is intended to mean coupling of components or subsystems in a way to permit communication of information between the components or subsystems. Two components or subsystems may be communicatively coupled through a wired or wireless communication network, including but not limited to Ethernet, LAN, fiber optics, radio, microwaves, Bluetooth, satellite, and the like. Operation and use of such communication networks is well known to those of ordinary skill in the art and will, therefore, not be discussed in detail herein.

Data collected can be transferred by the transmitter to a computer system present at the work site or at a remote location that collects, processes, and displays data directly or through a secondary computer system such as a laptop or portable device. Computer systems of the present disclosure include personal computers (e.g., desktop or laptop), tablet computers, mobile devices (e.g., personal digital assistant (PDA) or Smartphone), servers (e.g., blade server or rack server), a network storage devices, or any other suitable computing device and may vary in size, shape, performance, functionality, and price.

Data processing can be performed locally (on site) or by a remote or cloud-based computer system. Data captured from one or more probes in the transportable blending system 100 can be recorded and analyzed by computer system in real time, including analysis of the wellbore fluid properties at any point in time and calculation of changes over time. Computer systems can be programmed with instructions to perform various data manipulations including aggregating data from multiple probes and providing composite data, such as density, corrosion rates, or scaling rates.

Computer systems of the present disclosure can store data on any suitable computer-readable media that can include nonvolatile, hard-coded type media, such as read only memories (ROMs), or erasable, electrically programmable read only memories such as EEPROMs or flash memory; recordable type media, such as flash drives, memory sticks, and other newer types of memories; and transmission type media such as digital and analog communication links. For example, such media can include operating instructions, as well as instructions related to the apparatus and the method steps of the present disclosure and can operate on a computer system.

Embodiments disclosed herein include:

A. A transportable blending system that includes a container enclosure including a base, a roof, opposing first and second ends, and opposing first and second sidewalls extending vertically between the base and the roof and extending horizontally between the first and second ends, a pump located within the container enclosure and fluidly coupled to an inlet manifold penetrating the container enclosure, wherein a base fluid is conveyed to the pump via the inlet manifold, a mixing unit located within the container and in fluid communication with the pump to receive the base fluid, a hopper located within the container and fluidly coupled to the mixing unit, the hopper having an inlet aligned with an opening defined in the roof, wherein an additive is delivered to the hopper via the opening to be conveyed to the mixing unit and blended with the base fluid to generate a working fluid, and a working fluid manifold extending from the mixing unit to a discharge manifold penetrating the container enclosure, the working fluid manifold receiving the working fluid discharged from the mixing unit.

B. A method that includes transporting a blending system to a desired location, the blending system including a container enclosure that houses a pump fluidly coupled to an inlet manifold penetrating the container enclosure, a mixing unit in fluid communication with the pump, a hopper fluidly coupled to the mixing unit and having an inlet aligned with an opening defined in a roof of the container enclosure, and a working fluid manifold extending from the mixing unit to a discharge manifold penetrating the container enclosure. The method further including fluidly coupling the inlet manifold to a base fluid source containing a base fluid, conveying the base fluid to the pump, introducing an additive to the hopper via the opening, and conveying the additive to the mixing unit, blending the base fluid and the additive in the mixing unit and thereby generating a working fluid, conveying the working fluid to the discharge manifold via the working fluid manifold, and delivering the working fluid to a downstream location.

Each of embodiments A and B may have one or more of the following additional elements in any combination: Element 1: further comprising a motor located within the container enclosure and arranged to drive the pump. Element 2: further comprising a side maintenance panel removably coupled to one of the first and second sidewalls, wherein one or both of the pump and the motor are laterally aligned with the side maintenance panel. Element 3: wherein at least one of the pump and the motor is mounted to a skid arranged within the container enclosure, and wherein the skid is laterally removable from the container enclosure via the side maintenance panel. Element 4: wherein the mixing unit comprises at least one of an agitator, a mixer, a venturi mixing device, a jet pump, an eductor, an extender, a blender, a static mixer, and any combination thereof. Element 5: further comprising a secondary manifold fluidly coupled to the mixing unit to deliver a secondary additive to the mixing unit. Element 6: wherein the container enclosure comprises an intermodal shipping container compliant with universal shipping dimensions dictated by the International Organization for Standardization (ISO). Element 7: wherein the inlet of the hopper is sealed to an underside of the roof at the opening. Element 8: wherein at least one of the first and second ends includes one or more doors that facilitate operator access into the container enclosure. Element 9: further comprising at least one of the following a first valve arranged in an intake manifold extending between the pump and the mixing unit and operable to regulate flow of the base fluid to the mixing unit, a second valve arranged between the hopper and the mixing unit and operable to regulate flow of the additive into the mixing unit, and a third valve arranged in the working fluid manifold and operable to regulate flow of the working fluid to the discharge manifold. Element 10: further comprising a control unit communicably coupled to and programmed to operate one or more of the motor and the first, second, and third valves. Element 11: further comprising one or more sensors operable to monitor one or more operational parameters of the system, wherein the one or more sensors are in communication with the control unit. Element 12: wherein the one or more sensors are selected from the group consisting of a temperature sensor, a pressure sensor, a flow meter, a viscometer, a scale, a weigh bridge, a radar, and any combination thereof. Element 13: further comprising a scale positioned within the container enclosure at or near the first end, and a control panel positioned within the container enclosure at or near the second end, wherein the control unit is arranged within the control panel and is in communication with the scale. Element 14: wherein operation of the transportable blending system is automated using the control unit, and wherein the control unit includes communication means to enable an operator to remotely operate the transportable blending system. Element 15: wherein an intake manifold extends between the pump and the mixing unit to provide the base fluid to the mixing unit, the system further comprising a bypass manifold extending between the intake and working fluid manifolds, a first valve arranged in the intake manifold and operable to regulate flow of the base fluid to the mixing unit, and a second valve arranged in the bypass manifold and operable to regulate flow of the base fluid through the bypass manifold, wherein operation of the first and second valves cooperatively diverts all or a portion of the base fluid away from the mixing unit and through the intake manifold.

Element 16: wherein the container enclosure further houses a motor arranged to drive the pump and a side maintenance panel is removably coupled to one of the first and second sidewalls and laterally aligned with one or both of the pump and the motor, the method further comprising accessing one or both of the pump and the motor via the side maintenance panel. Element 17: wherein the inlet of the hopper is sealed to an underside of the roof at the opening and thereby generates a sealed interface, the method further comprising preventing dust from migrating into the interior of the container enclosure via the opening with the sealed interface. Element 18: wherein the container enclosure further houses a first valve arranged in an intake manifold extending between the pump and the mixing unit and operable to regulate flow of the base fluid to the mixing unit, a second valve arranged between the hopper and the mixing unit and operable to regulate flow of the additive into the mixing unit, a third valve arranged in the working fluid manifold and operable to regulate flow of the working fluid to the discharge manifold, and a control unit communicably coupled to one or more of the motor and the first, second, and third valves, the method further comprising operating one or more of the motor and the first, second, and third valves with the control unit. Element 19: further comprising remotely communicating with the control unit, and remotely operating the blending system through remote communication with the control unit.

By way of non-limiting example, exemplary combinations applicable to A, B, and C include: Element 1 and Element 2; Element 2 and Element 3; Element 9 and Element 10; Element 10 and Element 11; Element 11 and Element 12; Element 10 and Element 13; Element 10 and Element 14; and Element 18 and Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A transportable blending system, comprising: a container enclosure including a base, a roof, opposing first and second ends, and opposing first and second sidewalls extending vertically between the base and the roof and extending horizontally between the first and second ends;

a pump located within the container enclosure and fluidly coupled to an inlet manifold penetrating the container enclosure, wherein a base fluid is conveyed to the pump via the inlet manifold;

a mixing unit located within the container enclosure and in fluid communication with the pump to receive the base fluid;

a hopper located within the container enclosure and fluidly coupled to the mixing unit, the hopper having an inlet aligned with an opening defined in the roof, wherein an additive is delivered to the hopper via the opening to be conveyed to the mixing unit and blended with the base fluid to generate a working fluid; and a working fluid manifold extending from the mixing unit to a discharge manifold penetrating the container enclosure, the working fluid manifold receiving the working fluid discharged from the mixing unit.

2. The transportable blending system of claim 1, further comprising a motor located within the container enclosure and arranged to drive the pump.

3. The transportable blending system of claim 2, further comprising a side maintenance panel removably coupled to one of the first and second sidewalls, wherein one or both of the pump and the motor are laterally aligned with the side maintenance panel.

4. The transportable blending system of claim 3, wherein at least one of the pump and the motor is mounted to a skid arranged within the container enclosure, and wherein the skid is laterally removable from the container enclosure via the side maintenance panel.

5. The transportable blending system of claim 1, wherein the mixing unit comprises at least one of an agitator, a mixer, a venturi mixing device, a jet pump, an eductor, an extender, a blender, a static mixer, and any combination thereof.

6. The transportable blending system of claim 1, further comprising a secondary manifold fluidly coupled to the mixing unit to deliver a secondary additive to the mixing unit.

7. The transportable blending system of claim 1, wherein the container enclosure comprises an intermodal shipping container compliant with universal shipping dimensions dictated by the International Organization for Standardization (ISO).

8. The transportable blending system of claim 1, wherein the inlet of the hopper is sealed to an underside of the roof at the opening.

9. The transportable blending system of claim 1, wherein at least one of the first and second ends includes one or more doors that facilitate operator access into the container enclosure.

10. The transportable blending system of claim 1, further comprising at least one of the following:

a first valve arranged in an intake manifold extending between the pump and the mixing unit and operable to regulate flow of the base fluid to the mixing unit;

a second valve arranged between the hopper and the mixing unit and operable to regulate flow of the additive into the mixing unit; and a third valve arranged in the working fluid manifold and operable to regulate flow of the working fluid to the discharge manifold.

11. The transportable blending system of claim 10, further comprising a control unit communicably coupled to and programmed to operate one or more of the motor and the first, second, and third valves.

12. The transportable blending system of claim 11, further comprising one or more sensors operable to monitor one or more operational parameters of the system, wherein the one or more sensors are in communication with the control unit.

13. The transportable blending system of claim 12, wherein the one or more sensors are selected from the group consisting of a temperature sensor, a pressure sensor, a flow meter, a viscometer, a scale, a weigh bridge, a radar, and any combination thereof.

14. The transportable blending system of claim 11, further comprising: a scale positioned within the container enclosure at or near the first end; and a control panel positioned within the container enclosure at or near the second end, wherein the control unit is arranged within the control panel and is in communication with the scale.

15. The transportable blending system of claim 11, wherein operation of the transportable blending system is automated using the control unit, and wherein the control unit includes communication means to enable an operator to remotely operate the transportable blending system.

16. The transportable blending system of claim 1, wherein an intake manifold extends between the pump and the mixing unit to provide the base fluid to the mixing unit, the system further comprising:

a bypass manifold extending between the intake and working fluid manifolds; a first valve arranged in the intake manifold and operable to regulate flow of the base fluid to the mixing unit; and a second valve arranged in the bypass manifold and operable to regulate flow of the base fluid through the bypass manifold, wherein operation of the first and second valves cooperatively diverts all or a portion of the base fluid away from the mixing unit and through the intake manifold.

17. A method, comprising:

transporting a blending system to a desired location, the blending system including a container enclosure that houses:

a pump fluidly coupled to an inlet manifold penetrating the container enclosure;

a mixing unit in fluid communication with the pump;

a hopper fluidly coupled to the mixing unit and having an inlet aligned with an opening defined in a roof of the container enclosure; and a working fluid manifold extending from the mixing unit to a discharge manifold penetrating the container enclosure;

fluidly coupling the inlet manifold to a base fluid source containing a base fluid; conveying the base fluid to the pump;

introducing an additive to the hopper via the opening, and conveying the additive to the mixing unit;

blending the base fluid and the additive in the mixing unit and thereby generating a working fluid;

conveying the working fluid to the discharge manifold via the working fluid manifold; and delivering the working fluid to a downstream location.

18. The method of claim 17, wherein the container enclosure further houses a motor arranged to drive the pump and a side maintenance panel is removably coupled to one of the first and second sidewalls and laterally aligned with one or both of the pump and the motor, the method further comprising accessing one or both of the pump and the motor via the side maintenance panel.

19. The method of claim 17, wherein the inlet of the hopper is sealed to an underside of the roof at the opening and thereby generates a sealed interface, the method further comprising preventing dust from migrating into the interior of the container enclosure via the opening with the sealed interface.

20. The method of claim 17, wherein the container enclosure further houses:

a first valve arranged in an intake manifold extending between the pump and the mixing unit and operable to regulate flow of the base fluid to the mixing unit;

a second valve arranged between the hopper and the mixing unit and operable to regulate flow of the additive into the mixing unit;

a third valve arranged in the working fluid manifold and operable to regulate flow of the working fluid to the discharge manifold; and a control unit communicably coupled to one or more of the motor and the first, second, and third valves, the method further comprising:

operating one or more of the motor and the first, second, and third valves with the control unit.

21. The method of claim 20, further comprising:

remotely communicating with the control unit; and remotely operating the blending system through remote communication with the control unit.

* * * * *